United States Patent
Lambert et al.

[11] 3,908,821
[45] Sept. 30, 1975

[54] RECORD KEEPING TRAY AND ASSEMBLY

[75] Inventors: Gray Lambert; Paul N. Hanselman, both of Wheaton, Ill.

[73] Assignee: United Business and Professional Services, Inc., Oak Park, Ill.

[22] Filed: Nov. 9, 1973

[21] Appl. No.: 414,402

[52] U.S. Cl................ 206/73; 206/45.11; 224/48 C; 224/46 T; 229/27
[51] Int. Cl.$^2$.......................................... B65D 1/34
[58] Field of Search...... 206/73, 44 B, 45.11, 45.19, 206/72, 491; 229/1.5 R, 10, 27; 220/315, 22; 224/48 R, 46 T, 48 C

[56] References Cited
UNITED STATES PATENTS

| | | | |
|---|---|---|---|
| 439,401 | 10/1890 | Heinemann | 229/10 |
| 1,336,776 | 4/1920 | Drinkwater | 224/48 R |
| 1,572,239 | 2/1926 | Low | 229/1.5 R |
| 1,923,064 | 8/1933 | Bracken | 206/73 |
| 2,249,265 | 7/1941 | Bauder | 206/73 |
| 2,263,255 | 11/1941 | West | 206/72 |
| 2,511,542 | 6/1950 | Rau | 206/45.19 |
| 2,711,819 | 6/1955 | Lugt, Jr. | 206/72 |
| 2,796,190 | 6/1957 | Tupper | 220/315 |
| 2,803,391 | 8/1957 | Koeble | 229/27 |
| 3,055,494 | 9/1962 | Hepp | 206/45.19 |
| 3,494,536 | 2/1970 | Henry | 206/491 |
| 3,595,433 | 7/1971 | Jones | 206/44 B |
| 3,754,646 | 8/1973 | Henig | 206/45.11 |

*Primary Examiner*—William I. Price
*Assistant Examiner*—Joseph M. Moy
*Attorney, Agent, or Firm*—Hill, Gross, Simpson, Van Santen, Steadman, Chiara & Simpson

[57] ABSTRACT

A record keeping tray and assembly especially suitable for use as a financial organizer for filling canceled checks by various categories, there being in the tray an arrangement of inserts providing canceled check receiving pocket and a slot for accomodating a checkbook and bank statements. Within the check receiving pocket are respective sets of graduated folders to facilitate category subdivision.

18 Claims, 8 Drawing Figures

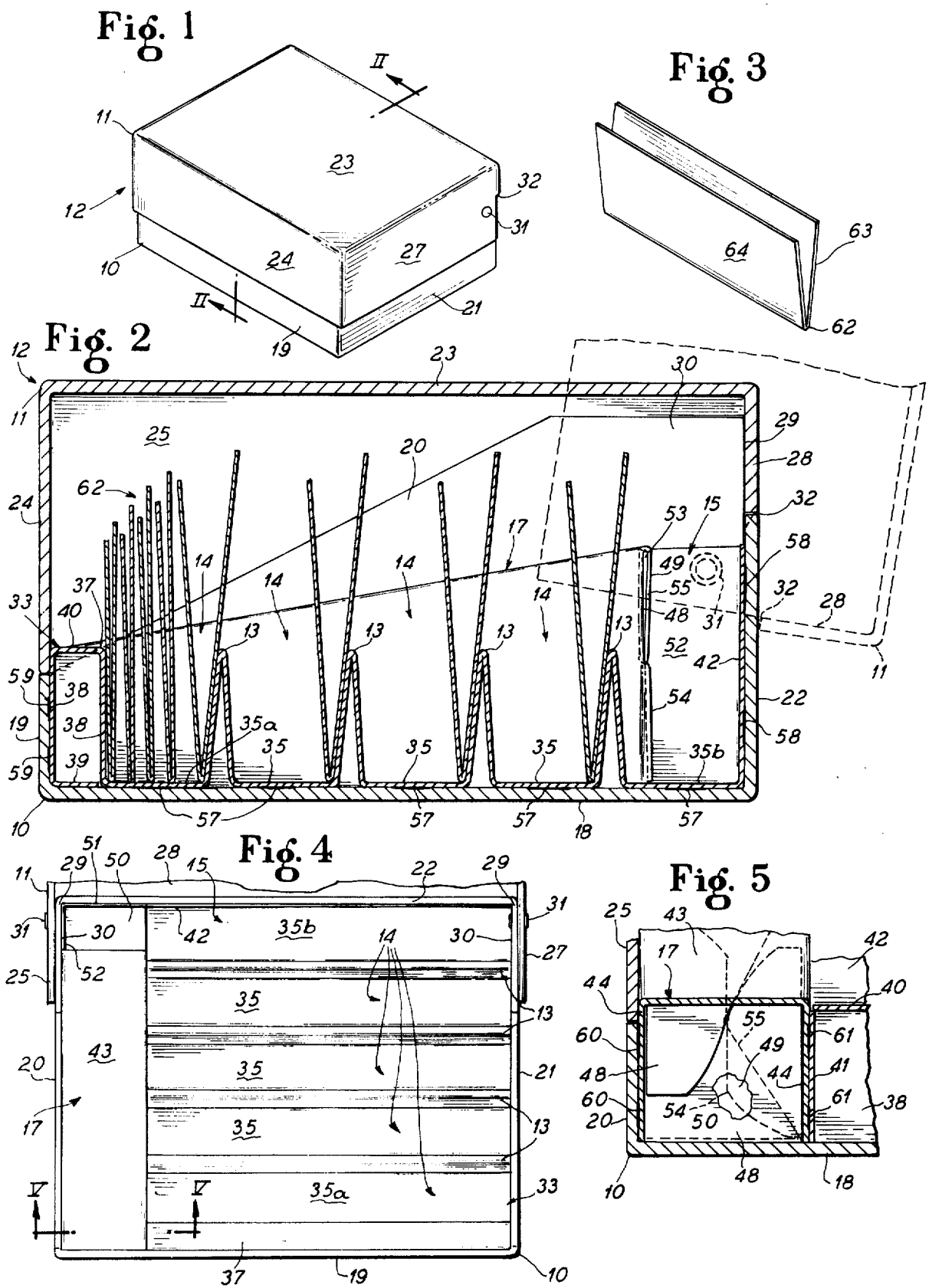

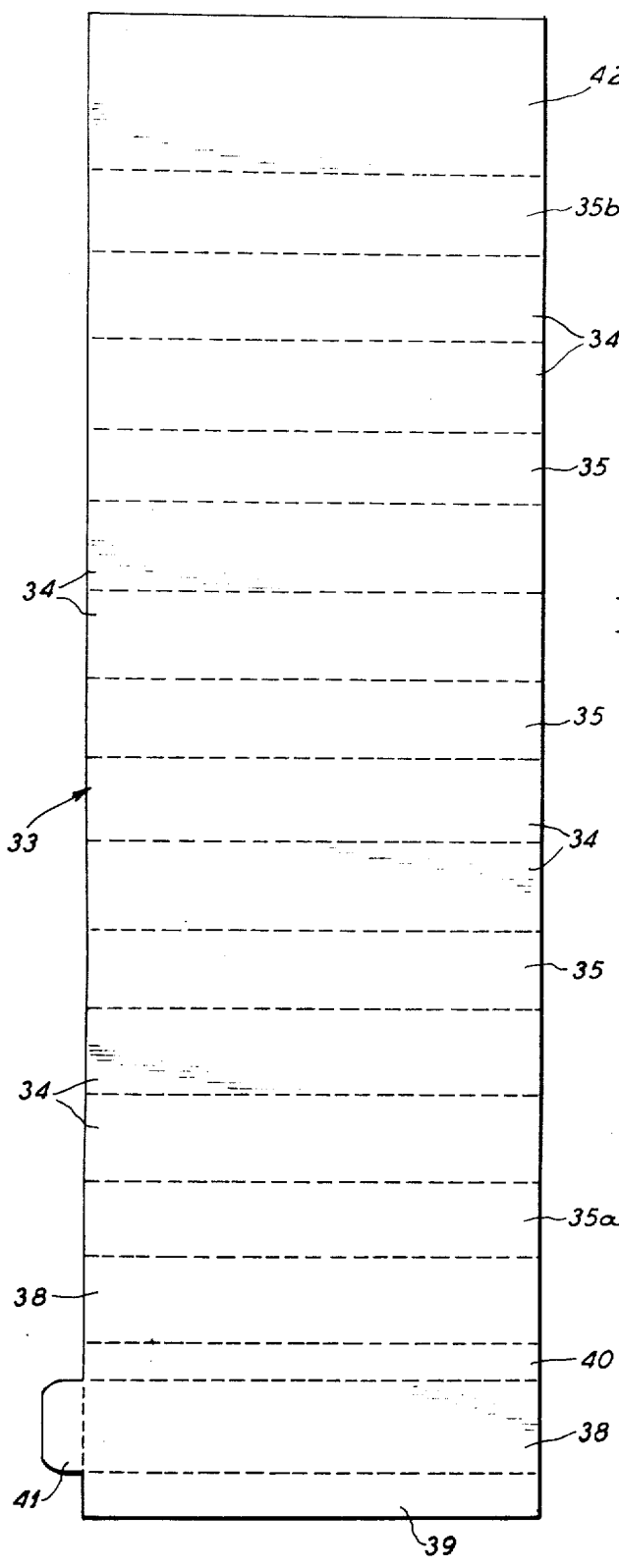
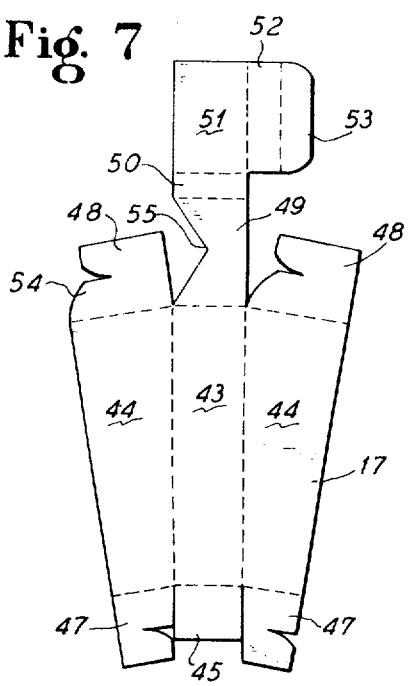
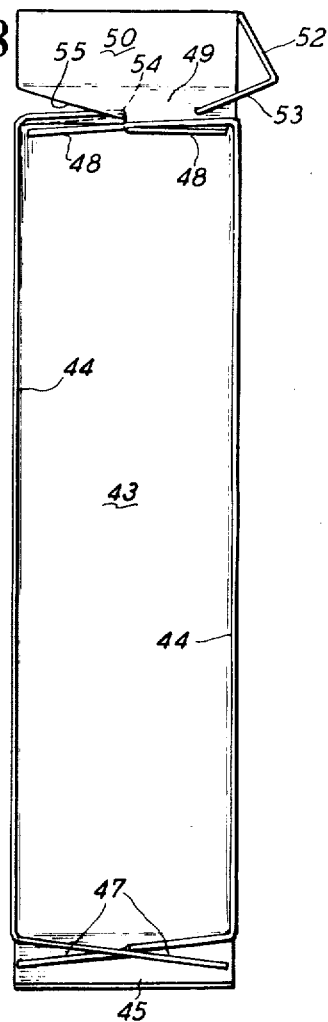

RECORD KEEPING TRAY AND ASSEMBLY

This invention relates to record keeping tray or box assemblies, and is more particularly concerned with a device of this kind especially suitable to serve as a financial organizer to facilitate record keeping with respect to a checking account.

Householders and others who must keep their own records and do not have the advantage of accounting assistance such as is enjoyed by larger business organizations are generally beset by the problem of record keeping, and more particularly maintaining their records in such fashion as to make them readily available for tax computation and possible subsequent review. In addition, such records may be useful in other ways such as for budgetary reasons, proofs of payment, and the like.

An important object of the present invention is to provide new and improved means for keeping checking account records.

Another object of the invention is to provide a new and improved record keeping tray construction which will lend itself especially for use as a financial organizer as related to a checking account.

A further object of the invention is to provide a new and improved record keeping tray especially suitable for segregating and storing canceled checks according to various convenient categories.

Still another object of the invention is to provide new and improved means for organizing and storing all documents relating to a checking account, including canceled checks from a checkbook and bank statements.

A still further object of the invention is to provide a new and improved record keeping tray construction embodying novel separator insert assembly.

It is also an object of the invention to provide a new and improved neat record keeping box with a hinged cover.

Other objects, features and advantages of the invention will be readily apparent from the following description of a certain preferred embodiment htereof, taken in conjunction with the accompanying drawings although variations and modifications may be effected without departing from the spirit and scope of the novel concepts embodied in the disclosure, and in which:

FIG. 1 is an isometric view of a record keeping tray according to the invention including a hinged box cover;

FIG. 2 is an enlarged sectional detail view taken substantially along the line II—II of FIG. 1;

FIG. 3 is an isometric view of a pocket folder to be used in the tray;

FIG. 4 is a top plan view of the tray;

FIG. 5 is a fragmentary sectional detail view taken substantially along the line V—V of FIG. 4;

FIG. 6 is a plan view in the flat of the subdividing pocket insert for the tray;

FIG. 7 is a plan view in the flat of the filler insert for the tray; and

FIG. 8 is a partially folded view of the filler insert.

On reference to FIGS. 1 and 2, a record keeping tray 10 includes in assembly therewith a hinged cover 11 providing in the closed condition with the tray a neat generally rectangular box 12. When the cover 11 is opened it exposes the tray, revealing subdividing means within the tray especially equipping the tray to serve as a financial organizer as related to a checking account.

For this purpose the tray has therein means providing spaced dividers 13 providing upwardly opening pockets 14 to receive canceled checks. Also provided within the tray is an upwardly opening slot 15 adapted to receive a checkbook and bank statements, such slot being defined in part by one of the dividers 13 and an end portion of a filler insert 17.

In a preferred form, the tray 10 is of rectangular outline in plan, having a bottom wall 18 and upstanding therefrom connected front wall 19 opposite side walls 20 and 21 and a rear wall 22. In a preferred construction, the front wall 19 is lower than the rear wall 22 and the side walls 20 and 21 are at least as high as the rear wall at juncture therewith but no higher than the front wall at the front of the tray and actually at least slightly inset relative to the top edge of the front wall.

Construction and relationship of the cover 11 to the tray 10 is such that a neat generally rectangular box is provided in the closed condition of the cover as shown in FIG. 1 and as shown in full outline in FIG. 2, but the cover can be readily swung into open condition as indicated in dash outline in FIG. 2. Further, the construction is such that when the cover is in the open condition, it will remain in a steady convenient rearwardly tilted position. To this end, the cover 11 is provided with a top wall 23 and depending front wall 24, opposite side walls 25 and 27 and a rear wall 28 all connect together. For neat cooperation and sturdiness, the cover front wall 24 rests at its lower edge in the closed condition of the cover on the upper edge of the front wall 19 of the tray, the side walls 25 and 27 of the cover lap the outer sides of the tray side walls 20 and 21, and the cover rear wall 28 has its lower edge contiguous to though not necessarily actually contacting the upper edge of the tray rear wall 22. By having the cover front wall 24 and rear wall 28 graduated in size inversely to the vertical height of the tray front wall 19 and the rear wall 22 and with the cover front wall sufficiently longer than the cover rear wall, a square profile is provided for the box assembly 12 in the closed condition of the cover. In addition, in the closed condition of the cover improved sturdiness is attained by having the inner face of the cover rear wall 28 engaged with rearwardly facing abutment edges 29 (FIGS. 2 and 4) of upwardly extended rear end portions 30 of the tray side walls 20 and 21. Thus the upwardly projecting portions 30 afford excellent lateral support and the rearward edges 29 afford excellent support against forward displacement of the cover.

In addition, the lateral and forward support for the cover as well as the close cooperation of the lower edges of the cover front and rear walls with the upper edges of the front and rear walls of the tray provide protection against strain and possible damage to hinge connections between the tray 10 and the cover 11. Such hinge connections desirably comprise simple rivets 31 located on a common axis and pivotally connecting rear end portions of the cover side walls 25 and 27 with rear end portions of the tray side walls 20 and 21. Location of the hinging pivots 31 is such that not only will the cover 11 properly match with the tray 10 in the closed condition of the cover but when the cover is open, the rear wall 28 of the cover will efficiently clear the upper edge of the rear wall 22 of the tray and the lower free edge of the cover rear wall will serve as a stop 32 in engagement with the outer side of the tray rear wall 22 for holding the cover in a generally upright open rearwardly tilted position but with the center of gravity of the cover sufficiently close to the plane of the rear wall 22 of the tray to avoid overbalancing the tray even when the tray is empty. To attain this, the pivots 31 are located in slightly forwardly spaced relation to the tray rear wall 22 and the plane of the cover rear wall 28, and at a proper elevation adjacently below the top edge of the tray rear wall 22. Such position of the hinge pivots 31 must be on the radius of an arc of movement of the cover rear wall abutment edge 32 from its coplanar closed condition relation to the tray rear wall 22 and its stop engagement with the tray rear wall in the open condition of the cover.

In a desirable, simple and efficient construction, the dividers 13 comprise folded up transverse ribs of an originally elongated one piece flat blank 33 (FIG. 6) of suitable cheap material such as cardboard. For this purpose, the sheet 33 is scored transversely along parallel lines from side to side to provide successive pairs of score hinge connected panels 34 and intervening spacer panels 35 such that when the panels 34 are folded up they will provide front and rear walls of the respective partitions or dividers 13 and the intervening panels 35 will provide spacers defining the bottoms of the record receiving pockets 14. In a preferred form, the insert panel 33 provides an integral attachment and stiffening rib 37 at the front of the tray 10, and for this purpose is provided with spaced substantially equal vertical rib panels 38, a terminal panel 39 and an intervening spacer panel 40 on the front end portion of the insert member sheet with the panels 38 of substantially the same vertical width as the divider rib panels 34 and the panels 39 and 40 substantially narrower and of about the same narrowest width such that when these panels are folded up on their dividing hinge score lines, into the forms shown best in FIG. 2, the panels 38 will provide respective front and rear walls for the rib 37 and the panel 40 top wall and the panel 39 a lower spacer flange extending rearwardly on the tray bottom 18 in a plane with and in rib-stabilizing relation to a spacer flange 35a connected with the next adjacent divider rib 13, whereby the rib 37 and the next adjacent spacer rib 13 provides the first or forwardmost record receiving pocket 14. Preferably the rib 37 extends slightly above the top edge of the tray front wall 19 as a stabilizing back-up for the lower margin of the cover front wall 34 in the closed cover condition.

As its rear end portion, the insert member 33 is provided with a base spacer panel extension 35b connected in scored hinged relation to a rear terminal flange panel 42 providing in the folded up, inserted position in the tray 10 and upstanding rear lead-in surface into the rearmost of the pockets 14, the panel 42 for this purpose extending upwardly a substantial distance higher than the tops of the spacer ribs 13.

In order to maintain canceled checks in a neat and orderly fashion in the pockets 14, the length of the pockets is dimensioned to be substantially the same as the length of canceled checks to be received in the pockets, but sufficiently oversized for clearance and ease of insertion and removal of the canceled checks on their longitudinal edges. On the other hand, a checkbook or check packet because of the record keeping stubs to which the checks are attached before use is necessarily longer than the checks themselves and therefore the pocket 15 must be longer than the check-receiving pockets 14. For this purpose, the filler member 17 has a width which is sifficient to accommodate the extra length desirable in the pocket 15. Construction and relationship of the filler member 17 to the pocket insert 33 is such that with the pocket insert crowded at one side against one of the side walls of the tray 10, the filler member 17 intervening between the opposite side wall of the tray and the pocket divider member 33 will close the adjacent ends of the pocket 14. For this purpose, the filler member 17 is constructed from a one piece foldable blank (FIG. 7) made from similar material to that from which the blank for the member 33. In laying out the blank for the member 17, it is die cut and scored to provide a top panel portion 43 and equal opposite, complementary side panel portions 44 of proper length for the purpose. When folded along their longitudinal connecting lines, the panel 43 provides a top for the filler 17 and the side panels extend in vertical parallel relation and rest at their lower edges on the bottom wall 18 of the tray (FIG. 5), providing a generally hollow rib-like structure.

For closing and stabilizing the front end of the member 17, the top panel 43 has a tab flange front end extension 45 which is turned downwardly along the front end of the side panels 44 which are provided with complementary notched overlapping interlocking tabs 47, the lower edges of the tab flange 45 and the tabs 47 resting on the bottom wall 18 contiguous to the front wall 19 and of a height substantially equal to the rib 37, the adjacent end of which is in close contiguity and has the tab 41 extending rewardly in neat finishing relation at the joint.

At its rear end, the member 37 is provided with means for stabilizing and positioning the rear end of the filler member in respect to the rear end portion of the insert member 33. For this purpose, the rear ends of the panels 44 are provided with complementary, notched overlapping interlocking tabs 48 (FIGS. 7 and 8) which in the set up condition engage with the bottom wall 18 of the tray (FIG. 5). A scored hinged extension from the rear end of the panel 43 provides a tab flange portion 49 of a length to extend down along the interlocked tabs 48 to the tray bottom 18. From the end of the flange 49 a spacer panel 50 lies along the bottom 18 in a plane with the flange 35b and extends to the rear wall 32 and is connected to an upwardly extending terminal panel flange 51 of the same length as the lead-in terminal flange 42 and lying in a plane therewith along the rear wall 22. For stability in the assembly, a scored lateral flange extension 52 at the appropriate side of the flange 51 and of the same width as the connecting and spacer panel 50 extends forwardly along the side wall of the tray along which the member 17 is located, herein the side wall 20. A score hinge connected terminal flange 53 on the flange 52 is tucked in between the panel 49 and the interlocked tabs 48. Further stability is gained by having a lobe 54 on the tab 48 on the innermost of the side panels 44 interlockingly engaged in a notch 55 provided in the adjacent side of the extension panel 49. Through this arrangement, the member 43 can be fully set up and handled as a complete stable unit to be readily assembled by inserting it into position in the tray 10 in cooperation with the insert member 33.

In order further to stabilize the assembly and permit vigorous handling in use, without danger of displacement of the inserts within the tray 18, both the insert 33 and the filler insert 17 which provides a closure for the adjacent ends of the pockets 14 and an extension at its rear end for the pocket 15, are adhesively secured in place. To this end, each of the panels 35, 35a and 35b may be adhesively bonded as by means of spots or stripes of adhesive 57 (FIG. 2) to the tray bottom wall 18. Similarly, stripes or spots of adhesive 58 may bond the flange 42 to the rear wall 22. Spots or bands of adhesive 59 may bond the front panel 38 to the front wall 19 of the tray. Similarly spots or bands of adhesive 60 may bond the contiguous side wall panel 44 to the tray side wall 20. Spots of adhesive 61 (FIG. 5) may secure the tab 41 to the contiguous filler side panel 44. Other spots of adhesive (not shown) may similarly secure the rear filler member flanges of panels 50, 51 and 52 to the engaged areas of the tray walls.

In order to provide a good support for holding a checkbook in generally upright position lying on one edge and with its stub end within the slot extension provided by the rear end of the filler 17, such rear end is preferably of a height which is somewhat greater than the width of such a checkbook or a pad of checks. Thereby such a checkbook or pad of checks or a plurality of such checks will be conveniently supported for access at the back of the tray. Normally such a checkbook or pads of checks will be inserted in the slot 15 with the stub portion at the left-hand side of the tray behind the filler member 17. Conveniently, for this purpose, the filler member is constructed to slope upwardly and rearwardly from its front end, as best seen in FIG. 2.

Since records such as canceled checks are individually rather flexible, and since such checks will in the course of time relate to a numerous type of transactions in the several categories, means are preferably provided to assist in separating the canceled checks into category subdivisions. For this purpose, upstanding, upwardly opening file folders 62 (FIGS. 2 and 3) are desirably supplied in groups of the desired number for each of the pockets 14. For example, each of the pockets may have six of the folders 62 each of which is provided with a rear panel 63 and a front panel 64, the front panel being vertically shorter than the rear panel for convenience in handling and in providing a rear upward tab extension in respect to the upper portion of the rear panel 63 on which suitable legends relating to various record keeping categories may be applied. In addition, each successive folder 62 from front to rear in each set may be of graduated height so as to facilitate reading of the category legends on the folders in each group. Thereby as canceled checks are returned by the bank, and checked off against the stubs retained at the back of the tray in the slot 15, the checks can be inserted into the appropriate folders 62 within the pockets 14. A similar set of the folders 62 may be provided within the slot 15, if desired, to receive and separate bank statements. On the other hand the bank statements may simply be inserted into the slot with the checkbook or check pads and check stubs.

From the foregoing it will be apparent that the present invention provides a useful, convenient, efficient, compact, sturdy, attractive, orderly, record keeping box assembly which can be produced and sold at low cost for effective record keeping, especially suitable for record keeping through canceled checks. Not only do the folders 62 provide an excellent means for subdividing the checks by numerous categories identified by suitable legends on the folders, but the several divider partition ribs 13 may also be provided with suitable legends indicating broad category groupings or major subdivisions of which the folders provide respective keyed groups of minor subdivisions within the broad subdivisions. In addition, since the top wall 43 of the filler insert 17 slopes upwardly toward the rear, it provides a convenient surface for receiving legends orienting the user to the location of category subdivisions within the pockets 14 and the slot 15.

It will be understood that variations and modifications may be effected without departing from the spirit and scope of the novel concepts of this invention.

We claim as our invention:

1. A record keeping tray having a bottom wall and upstanding connected front, rear and side walls, and comprising:

divider means supported on said bottom wall and providing upwardly extending spaced dividers with ends at one of said side walls and opposite ends spaced from the other side wall;

and a filler mounted between said other side wall and the those ends of the dividers which are spaced from said other side wall;

said filler defining together with one of the dividers which is adjacently spaced from said rear wall an upwardly opening record-receiving slot having its opposite ends at said side walls;

said dividers defining upwardly opening record-receiving pockets shorter than said slot and closed at one end by said one side wall and at the opposite end by said filler.

2. A tray according to claim 1, including a plurality of upwardly opening removable record subdividing folders in said pockets.

3. A tray according to claim 2, said folders being of progressively increasing height from front to rear in said pockets.

4. A tray according to claim 1, wherein said divider means comprise a one piece scored and folded insert resting on said bottom wall, having said dividers formed by folded up spaced portions of the insert with intervening flap spacer panels of substantial width engaging said bottom wall.

5. A tray according to claim 4, said insert including a folded hollow stabilizing rib at its front end engaging with said front wall, said rib being closed at one end by said one wall and at its opposite end abutting said filler.

6. A tray according to claim 5, wherein said stabilizing rib projects upwardly a limited distance above said front wall, and a cover hingedly connected to said tray adjacent to said rear wall and having a front lower edge engaging with the upper edge of said tray front wall in the closed position of the cover and with the upstanding portion of said rib providing a backup for the cover front wall.

7. A tray according to claim 6, said cover having side walls lapping the tray side walls and a rear wall lying in a plane with the tray rear wall in the closed position of the cover, the tray side walls having rearwardly directed edge portions extending above the tray rear wall and engagable in stabilizing relation with the cover rear wall.

8. A tray according to claim 1, wherein said divider means comprise a one piece folded insert having a rear end formation engaging with said rear wall and maintaining said one divider spaced from the rear wall the width of said slot.

9. A tray according to claim 1, wherein said filler comprises a hollow member folded up from a one piece blank.

10. A tray according to claim 9, wherein said filler member blank provides a top panel, side panels having longitudinal edges engaging said bottom wall, interlocking notched tabs on said side panels closing a front end of the member, interlocking notched tabs on said side panels closing a rear end of the member, and a spacer and reinfrocing extension from said top panel extending downwardly and then rearwardly along said bottom wall and fitting in said record-receiving slot between the rear end of the filler member and said tray rear wall.

11. A tray according to claim 1, wherein said filler comprises a hollow member folded up from a one piece blank having a front end portion including notched tabs interlocked for maintaining the member in folded up condition.

12. A tray according to claim 1, wherein said filler member comprises a hollow member having means engaging the adjacent side wall of the tray and means engaging the front and rear walls of the tray as well as the bottom wall.

13. A tray according to claim 12, wherein said filler has an upper surface extending obliquely rearwardly and upwardly to a substantially greater height at its rear end than the height of said dividers.

14. A tray according to claim 1, wherein said divider and filler means comprise folded inserts, and adhesive means bonding said inserts in said tray.

15. A tray according to claim 1, wherein said filler comprises a hollow member folded up from a one-piece blank and provides a top panel, side panels having longitudinal edges engaging said bottom wall, interlocking notched tabs on said side panels closing a front end of the member, interlocking notched tabs on said side panels closing a rear end of the member, and a spacer and reinforcing extension from said top panel folded downwardly along the rear of said notched tabs closing the rear end of the member and then folded to extend rearwardly along said bottom wall and then folded to extend upwardly along said rear wall with a flange extending forwardly from the rear wall engaging portion along the adjacent side wall of the tray, and a terminal flange extending from the side wall engaging flange in tucked relation between the downwardly extending portion of the extension and said tabs closing the rear end of the member.

16. A tray according to claim 1, including a cover hingedly connected to said tray adjacent to said rear wall and having a front wall lower edge engaging with the upper edge of said tray front wall in the closed position of the cover, said insert and said filler having portions thereof extending above said front wall and providing backup for the cover front wall.

17. In a record keeping tray having a bottom wall and upstanding connected front, rear and side walls:
a cover having a top wall and depending connected front, side and rear walls;
the cover and tray together providing in closed position of the cover a substantially rectangular box;
said cover side walls at least in their rear portions lapping the outer faces of said tray side walls;
the front wall of the cover having a lower edge which engages the upper edge of the tray front wall in the closed position of the cover;
said rear wall of the cover having its edge overlying the tray rear wall upper edge in the closed position of the cover;
said rear wall of the cover providing a stop engaging the rear wall of the tray in the open position of the cover;
pivot means connecting said rear portions of the cover side walls to the lapped rear portions of the tray side walls;
said pivot means located on an axis centered substantially on the radius of arc of movement of the cover rear wall lower edge between its tray rear wall overlying position and its stop positions during opening and closing of the cover; and
insert means within the tray having a stabilizing rib extending along and projecting above said front wall of the tray and providing a backup for the cover front wall in the closed position of the cover.

18. A tray according to claim 17, including an elongated filler extending between said insert and one side wall of the tray and having a front end contiguous to said tray front wall and projecting above said tray front wall upper edge and providing backup for the front wall of the closed cover in addition to the backup provided by the upwardly extending portion of the insert.

* * * * *